United States Patent [19]

Apatoczky

[11] 3,887,157
[45] June 3, 1975

[54] CRYSTALLIZER MOLD
[75] Inventor: Charles J. Apatoczky, York, Pa.
[73] Assignee: Teledyne, Inc., York, Pa.
[22] Filed: Aug. 9, 1973
[21] Appl. No.: 387,136

[52] U.S. Cl............... 249/79; 164/283 M; 164/348
[51] Int. Cl............................................ B22d 27/04
[58] Field of Search............ 249/79; 164/283 M, 348

[56] References Cited
UNITED STATES PATENTS
2,330,277  9/1943  Fritschle .............................. 249/79
2,479,191  8/1949  Williams .............................. 249/79
2,862,265  12/1958  Vaughn................................ 249/79

Primary Examiner—Al Lawrence Smith
Assistant Examiner—Margaret M. Joyce
Attorney, Agent, or Firm—Shoemaker and Mattare

[57] ABSTRACT

A crystallizing mold for cooling and shaping weld metal, comprising a coolant jacket, a weld metal engaging mold supported within said coolant jacket and defining with said coolant jacket a plurality of separate cooling zones, each zone having a tortuous coolant fluid flow passage therethrough, and a coolant fluid inlet and outlet for each passage to circulate coolant fluid through each zone and thus cool weld metal engaged by the mold.

13 Claims, 6 Drawing Figures

3,887,157

SHEET 1

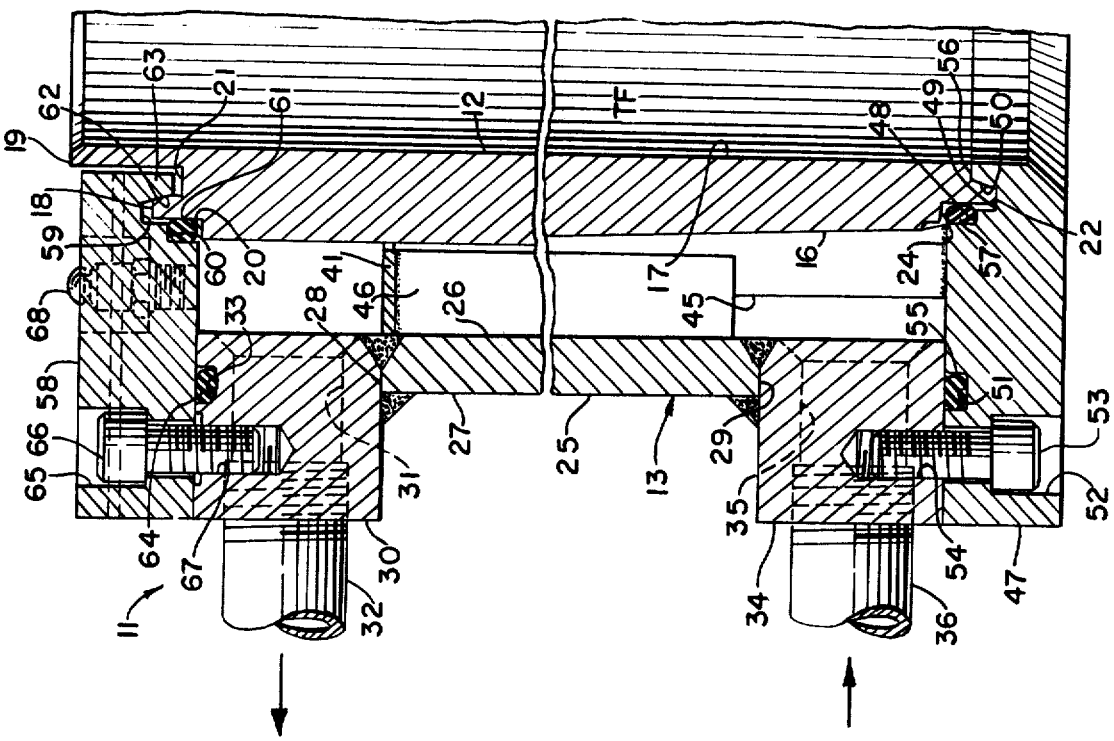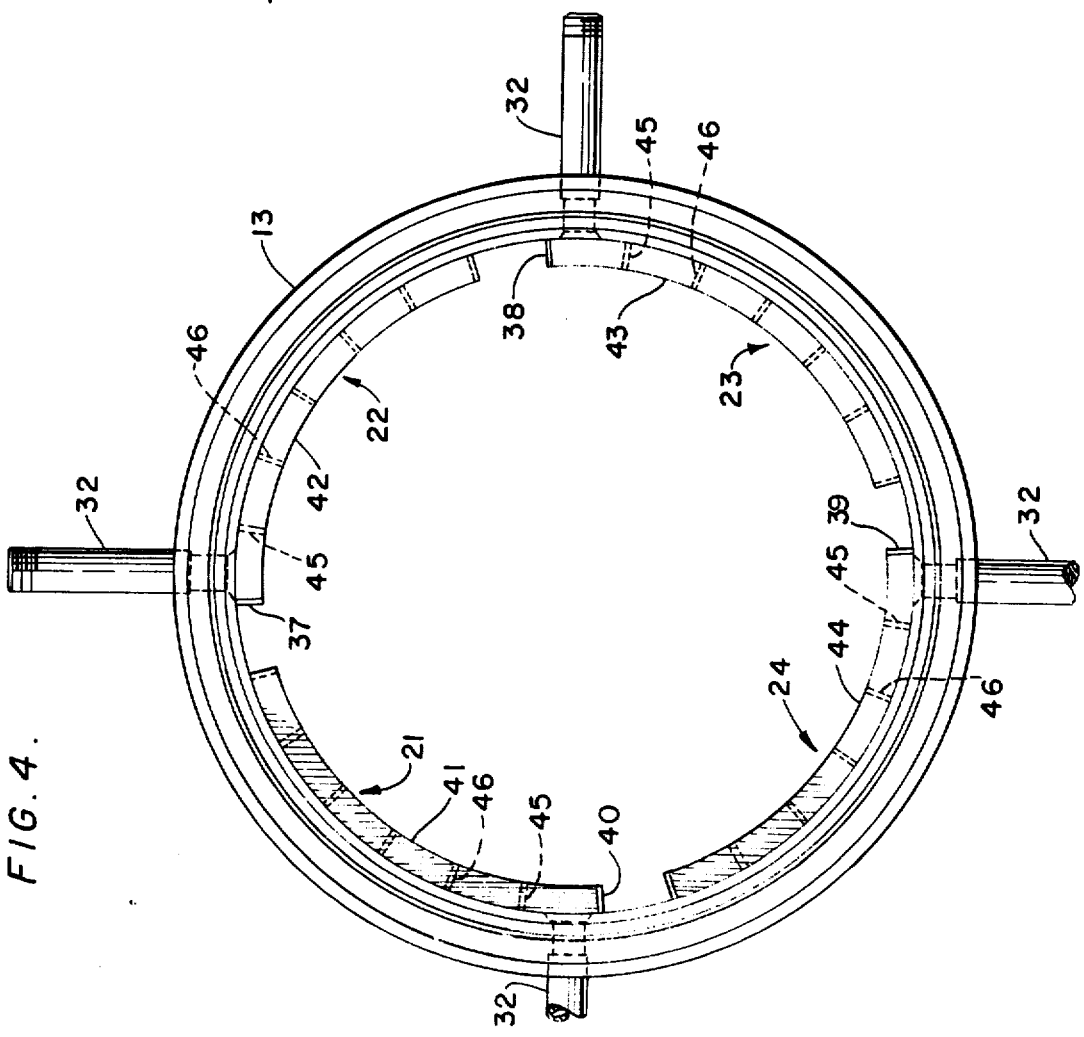

CRYSTALLIZER MOLD

BACKGROUND OF THE INVENTION

This invention relates to a cooling and shaping means for cooling and shaping weld metal deposited on articles to resurface articles or change their shape or size or characteristics as desired. For example, large cylindrically shaped steel mill rolls as used in steel mills must frequently be resurfaced in order to render them satisfactory for their intended purpose. In the prior art, various means have been relied upon to resurface these steel mill rolls or in some instances the steel mill rolls have been discarded due to the expense and time involved in resurfacing them to render them satisfactory for their intended use.

Copending application Ser. No. 262,191, filed June 13, 1972, and now U.S. Pat. No. 3,777,106, is assigned to the same assignee as the present invention, and in said copending application a machine for resurfacing damaged steel mill rolls is disclosed. In this machine a cooling and shaping ring is supported for movement relative to the article to cool and shape the weld metal deposited on the article. The crystallizing mold of the present invention is suitable for use in the machine of said copending application or in any other suitable machine or equipment in which weld metal is deposited upon an article.

In the crystallizing mold of the present invention, a tubular or cylindrical water jacket or coolant fluid jacket is provided with means thereon for cooperatively supporting a mold within the jacket and with said jacket and mold defining therebetween a plurality of cooling zones each having a tortuous flow passage therethrough. A coolant fluid inlet and outlet is connected with each passage to circulate coolant fluid through each zone to cool the mold and thus cool weld metal engaged by the mold. The assembled coolant jacket and mold define a cooling ring which is supported in a cooling ring holder, which is in turn supported on a cooling ring holder bracket positioned on a supporting frame such as, for example, the lower platform in the machine described in said aforementioned patent application Ser. No. 262,191, now U.S. Pat. No. 3,777,106, for supporting and moving the cooling ring relative to an article supported in the machine.

With the present invention, rapid and uniform cooling of the weld metal is effected because of the unique construction of the coolant jacket and mold, and a minimum amount of coolant fluid is required in order to effect rapid and uniform cooling of the weld metal. Moreover, the cooling ring according to the present invention is simple and economical to manufacture and may be readily adapted for use with a wide variety of sizes of articles merely by changing the mold size, for example.

OBJECTS OF THE INVENTION

It is an object of this invention to provide a crystallizing mold for cooling and shaping weld metal wherein the crystallizing mold includes a coolant fluid jacket and a mold supported therewithin, said mold and jacket defining therebetween a plurality of cooling zones, each having a tortuous coolant flow passage therein and a coolant fluid inlet and outlet for each passage to thus effect rapid and uniform cooling of weld metal deposited on an article and engaged by said mold.

Another object of this invention is to provide a crystallizing mold for cooling and shaping weld metal wherein the crystallizing mold is of simple and economical construction and which effects rapid and uniform cooling of weld metal deposited on an article while at the same time requiring a minimum amount of coolant fluid.

BRIEF DESCRIPTION OF THE DRAWINGS

FIG. 4 is an enlarged plan view of the coolant jacket with the mold removed therefrom.

FIG. 5 is a greatly enlarged sectional view with portions broken away of the assembled coolant jacket and mold defining a cooling ring according to the invention.

DETAILED DESCRIPTION OF THE INVENTION

Figure 1:
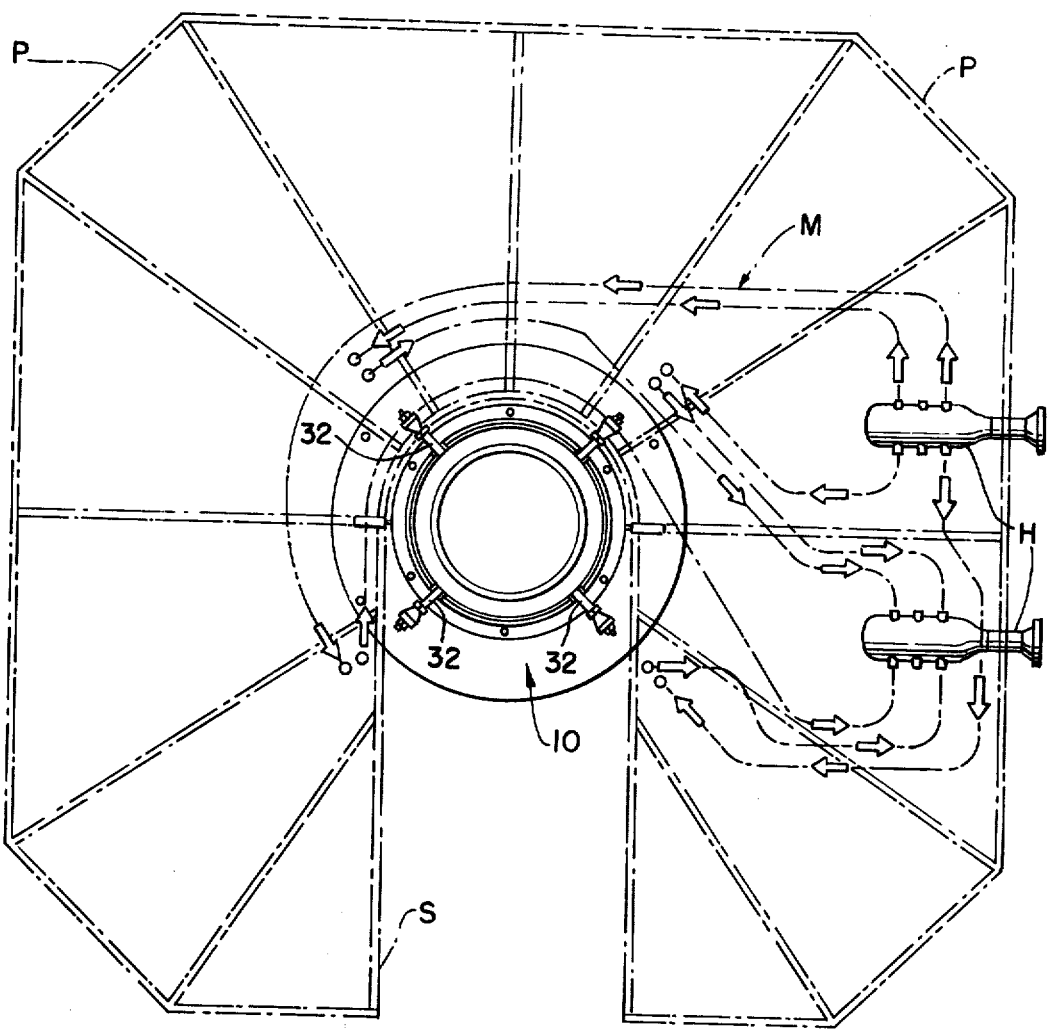
FIG. 1 is a plan view of a portion of a machine in which the crystallizing mold of the invention is used and showing a coolant fluid manifold arrangement for supplying and exhausting coolant fluid to the crystallizing mold.
Figure 2:
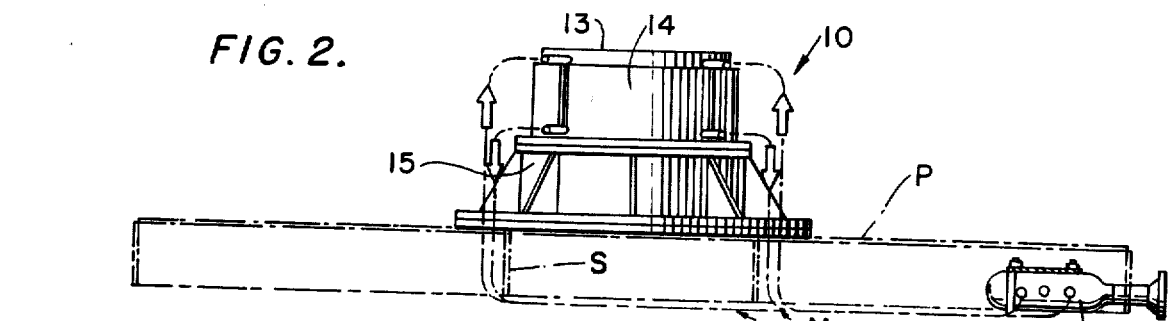
FIG. 2 is a view in elevation of the apparatus shown in FIG. 1.

In the drawings, wherein like reference numerals indicate like parts throughout the several views, a crystallizing mold in accordance with the invention is indicated generally at 10 in FIG. 1. The crystallizing mold 10 is shown supported on a platform P such as the lower platform in the machine described, for example, in said copending application Ser. No. 262,191, now U.S. Pat. No. 3,777,106, although the crystallizing mold could equally as well be used with other types of machines or apparatus as desired. A suitable manifold means M is connected between a pair of header pipes H and the crystallizing mold 10 for supplying and exhausting coolant fluid to the crystallizing mold.

As described in the aforesaid application Ser. No. 262,191, now U.S. Pat. No. 3,777,106, the platform P has a slot S through one side thereof to enable an article to be resurfaced to be positioned in approximately the center of the platform P and the crystallizing mold 10 is then positioned over the end of the article and in surrounding relationship thereto. The machine is then operated to raise the platform P relative to the article as weld metal is deposited on the article between the article and crystallizing mold and the crystallizing mold cools and shapes the weld metal deposited on the article. The machine itself comprises no part of the present invention and accordingly further description thereof is not deemed to be necessary and a more complete explanation of the machine can be obtained by referring to the aforesaid U.S. Pat. No. 3,777,106. It is to be understood that the crystallizing mold described and illustrated herein is not limited to use with the aforesaid machine but can be used with any suitable apparatus as desired.

Figure 3:
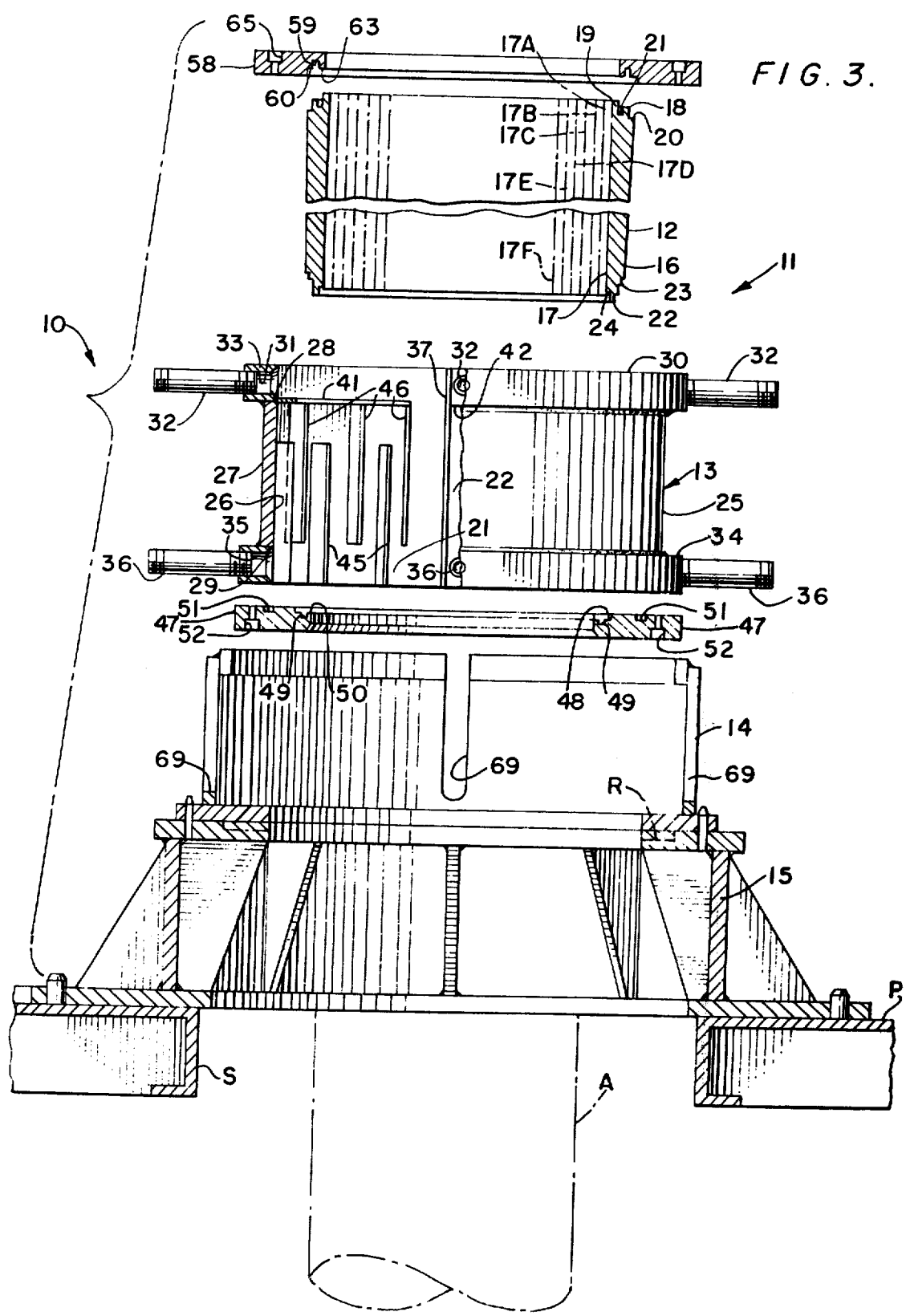
FIG. 3 is an exploded, sectional, enlarged view of the crystallizing mold and a portion of the supporting structure therefore.

The crystallizing mold 10 comprises a cooling ring 11 including a cylindrical mold 12 of copper or other suitable heat conducting material and a coolant jacket 13, preferably made of stainless steel, and the like, to resist corrosion by the coolant water, for receiving and holding the mold 12 to cool the mold and thus cool the weld metal engaged by the mold. The cooling ring 11 is supported in a cooling ring holder 14, also preferably made of stainless steel, and the like, which is in turn supported on top of a cooling ring holder bracket 15 positioned for example, on the lower platform P of a machine as described in the aforesaid U.S. Pat. No. 3,777,106. The crystallizing mold 10 is positionable about an article A as seen in FIG. 3 in phantom lines, for example, to cool weld metal deposited on the article A between the article and the mold 12 by suitable electrode means, not shown. If desired, the cooling ring holder can be omitted and the cooling ring supported in a recess R in the upper surface of bracket 15, as shown in dotted lines in FIG. 3. Suitable means, not shown, are provided for securing jacket 13 to the top plate of bracket 15.

As seen best in FIGS. 3 and 5, the mold 12 is cylindrical in shape and preferably has a tapered outer surface 16 and a tapered inner surface 17, said outer surface tapering inwardly toward the lower end of the mold 12, and said inner surface tapering outwardly toward the lower end of the mold, as viewed in FIGS. 3 and 5. In a preferred construction, for example, the outer surface 16 tapers inwardly at an angle of approximately 1½° relative to the vertical and the inner surface 17 tapers outwardly approximately ½° from the vertical, although it is to be understood that these surfaces may have other angles of taper or may not be tapered at all, as desired. Further, the mold 12 may be readily accommodated to articles of different size merely by substituting molds having different inside diameters, as indicated in the phantom lines 17A, 17B, 17C, 17D, 17E and 17F, respectively, each of said lines representing a different thickness of the mold 12 for accommodating different size articles. Further, the upper end edge surface of the mold 12 has a pair of annular, upstanding, spaced apart walls 18 and 19 thereon with the wall 19 extending axially farther than wall 18 and defining an annular, outer, axially facing shoulder 20 and an annular channel 21 on said upper end surface.

The lower end edge surface of the mold 12 has a stepped configuration and an annular, axially extending wall 22 thereon defining an outer, axially downwardly facing shoulder 23, and an inner, axially downwardly facing shoulder 24 thereon.

The coolant jacket 13 comprises a cylindrical side wall 25 having an inner cylindrical surface 26 and an outer cylindrical surface 27 and an upper end edge surface 28 and a lower end edge surface 29. An annular ring 30 of substantially square transverse cross-section is suitably affixed as by a weld or the like to the upper end surface 28 of the side wall 25 and substantially flush at its inner surface with the inner surface 26 of the side wall 25. A plurality of radially extending threaded openings 31 are formed in the ring 30 for threaded attachment thereto of short outlet pipe fittings 32, which are connected to the manifold means M for circulation of coolant fluid through the jacket 13. An annular, axially upwardly facing channel 33 is formed in the upper surface of the ring 30.

A substantially similar annular ring 34 of substantially square transverse cross-section is suitably affixed as by a weld or the like to the lower edge surface 29 of side wall 25 flush with the inner surface 26 of the side wall and has a plurality of threaded openings 35 extending radially therethrough and in which a plurality of relatively short inlet pipe fittings 36 are threaded for attachment to the manifold means M for circulation of coolant fluid through the coolant jacket 13.

A plurality of axially extending, radially projecting walls or barriers 37, 38, 39 and 40 are welded or otherwise suitably affixed along one edge thereof to the inner surface 26 of side wall 25 of coolant jacket 13, dividing the inner surface 26 of the jacket into a plurality of cooling zones Z1, Z2, Z3 and Z4. The barriers or walls 37, 38, 39 and 40 are substantially coextensive in length with the height of the coolant jacket 13, including the length of the side wall 25 and the width, or height, of the rings 30 and 34.

Figure 6:
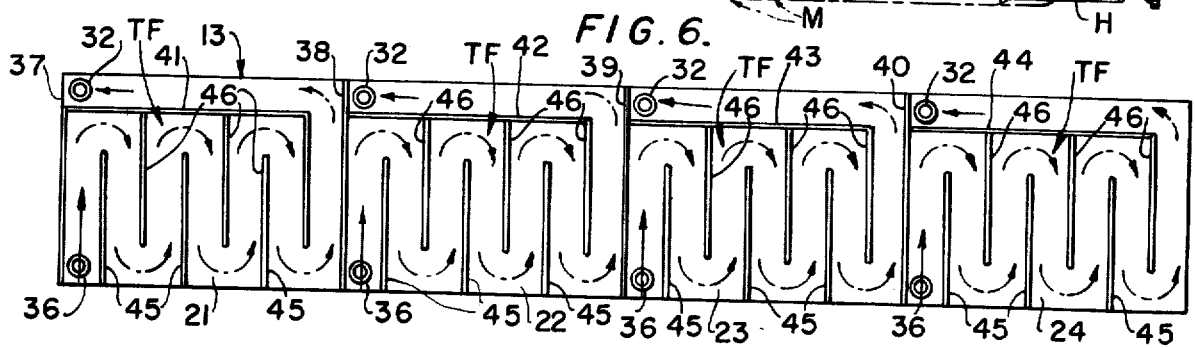
FIG. 6 is a developed view of the coolant jacket showing the plurality of separate cooling zones and tortuous flow passages therein.

As seen best in FIG. 6, an inlet 36 for coolant fluid is disposed adjacent one end of each cooling zone adjacent a respective wall 37, 38, 39 or 40 near the bottom thereof, and an outlet 32 for the coolant fluid is similarly disposed in an upper portion of each cooling zone in substantial vertical alignment with the inlet 36.

Circumferentially extending, radially projecting walls or barriers 41, 42, 43 and 44 are suitably secured as by a weld or the like to the inner surface 26 of the jacket adjacent the upper end surface of the wall 25 and extending from a respective barrier 37, 38, 39 and 40 toward, but spaced from, the next adjacent barrier of an adjacent cooling zone, and interposed between the inlet and outlet for each zone.

A plurality of axially extending, radially projecting baffles 45 are suitably secured to the inner surface 26 of wall 25 in each zone Z1, Z2, Z3 and Z4, said baffles extending upwardly from the lower edge of the jacket 13 toward, but spaced below the barriers 41, 42, 43 and 44.

A plurality of substantially identical axially downwardly extending and radially inwardly projecting baffles 46 are secured to the inner surface 26 of the wall 25 as by a weld or the like and extend downwardly from the barriers 41, 42, 43 and 44 in each zone toward the lower edge of the jacket but spaced upwardly therefrom and arranged in alternating, staggered relationship relative to the baffles 45, to thus define a tortuous flow passage TF in each zone Z1, Z2, Z3 and Z4. Thus, the flow of coolant fluid is constrained to move from the inlets 36 around the baffles 45 and 46 and then outwardly above the barriers 41, 42, 43 and 44 to the outlets 32.

An annular mold retaining ring or plate 47, preferably of stainless steel, and the like, is secured to the bottom surface of ring 34 at the lower end of the jacket and the upper inner marginal surface of the retaining ring 47 has a stepped channel configuration therein defining an axially upwardly facing shoulder 48 and an axially upwardly open channel 49, defined by an annular upstanding wall or flange 50 on the inner marginal edge of ring 47. An annular channel 51 is also formed in the upper surface of the plate 47, spaced radially outwardly from channel 49, and a plurality of circumferentially spaced openings 52 extend through the plate 47 adjacent the outer periphery thereof. A plurality of suitable fastening means, such as bolts 53, or the like are extended through openings 52 into threaded openings 54 in the lower ring 34 of jacket 13 to secure the plate to the lower end of the jacket, and the plate is sealed to the ring 34 by means of a suitable sealing gasket such as an O-ring 55 or the like disposed in channel 51.

The mold 12 is positioned concentrically within the jacket 13 and the axially extending annular wall 22 on the lower end thereof is received in the channel 49 in retaining ring 47, the mold 12 being accurately guided and seated relative to the ring 47 by means of a pair of cooperatively interengaged tapered walls 56 on the upstanding wall or flange 50 of the ring 47 and on annular wall 22 of mold 12. The lower end of mold 12 is sealed relative to the ring 47 by means of a suitable sealing gasket such as O ring 57 or the like interposed between axially downwardly facing shoulder 24 on mold 12 and axially upwardly facing shoulder 48 on ring 47.

A similar annular retaining ring or plate 58, preferably of stainless steel, and the like, is secured to the upper end of the jacket to retain the mold in position within the jacket and the upper ring 58 has a stepped channel configuration 59 therein with an axially downwardly facing annular shoulder 60 in opposing relationship to axially upwardly facing shoulder 20 on the mold 12 and between which a suitable sealing gasket such as O ring 61 or the like is engaged. The upstanding annular wall 18 on mold 12 is received in the channel 59 and is accurately centered or guided into correct operative relationship with respect to the ring and cooling jacket by means of complementary, interengaged tapered surfaces 62 on the upstanding wall 18 of mold 12 and on a downwardly projecting annular wall 63 on the inner marginal edge of retaining ring 58.

The retaining ring 58 is sealed with respect to the ring 30 by means of a suitable sealing gasket such as O ring 64 or the like positioned in annular channel 33 of ring 30. A plurality of circumferentially spaced openings 65 extend through the ring 58 adjacent its outer periphery and a plurality of suitable fastening means such as bolts 66 or the like extend through the openings 65 and into threaded openings 67 in ring 30. Suitable pressure relief means 68 are provided in the retaining ring 58 in communication with the tortuous fluid passage TF for relieving excessive pressure therefrom, if desired.

Thus, with the mold secured and sealed within the cooling jacket as seen in FIG. 5, the coolant fluid is constrained to move around the baffles from the inlets 36 to the outlets 32 and in circulating engagement with the outer surface 16 of mold 12 to cool the mold and thus cool the weld metal engaged by the mold.

The cooling ring 11, comprising the secured together mold 12 and coolant jacket 13 as in FIG. 5 is then positioned and supported in the cooling ring holder 14 which has a plurality of slots 69 therein to accommodate the inlet and outlet fittings 36 and 32 of the coolant jacket. The cooling ring holder 14 is supported on the upper end of the cooling ring holder bracket 15, as more fully described in said copending application Ser. No. 262,191, now U.S. Pat. No. 3,777,106, for supporting the cooling ring on the platform P of a suitable machine, and with the cooling ring disposed in surrounding relationship to the article A to cool and shape weld metal deposited on the article A.

In a specific example of the present invention, the mold 12 is made of copper and has a diameter of approximately 20¼ inches and a height of approximately 15 inches. Molds having different inside diameters, from 12 to 18 inches, for example, may be substituted, as seen in FIG. 3, to accommodate articles of different size. The coolant jacket 13 is approximately 14⅝ inches high and the side wall 25 is approximately ⅝ of an inch thick and about 8½ inches high. The wall 25 of jacket 13 has an inside diameter of about 22 inches, and the barriers 41, 42, 43 and 44 are spaced downwardly from the upper edge of the jacket about 2 inches, and the baffles 45 are spaced downwardly from the barriers about 2½ inches and are spaced circumferentially apart approximately 2½ inches.

Water is the preferred coolant fluid used in the crystallizing mold although other suitable cooling fluids may be used, as desired.

The crystallizing mold of the invention may have other shapes than that specifically described and illustrated herein and may have other sizes as required by the intended use of the crystallizing mold.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

I claim:

1. A crystallizing mold for cooling and shaping weld metal, comprising a coolant jacket, a weld metal engaging mold supported within said coolant jacket and defining with said coolant jacket a plurality of separate cooling zones, baffle means in each of the cooling zones defining a tortuous coolant fluid flow passage through each zone, coolant fluid inlet and outlet means for each passage to circulate the coolant fluid through each zone to cool the mold supported within the jacket and thus cool weld metal engaged by the mold, a pair of similar annular retaining rings secured to the upper and lower edges, respectively, of the jacket, and interengaging channel and wall means on said mold and retaining rings to accurately position and maintain said mold in said jacket.

2. A crystallizing mold as in claim 1, wherein said mold is removably supported in said jacket so that molds of different size for articles of different size may be positioned in the mold.

3. A crystallizing mold as in claim 1, wherein the coolant fluid inlet for each cooling zone is adjacent the bottom of the zone and the coolant fluid outlet for each zone is adjacent to the top of the zone for circulation of coolant fluid substantially from the bottom to the top of the mold.

4. A crystallizing mold as in claim 3, wherein the jacket is spaced radially outwardly from the mold defining a space for coolant fluid therebetween, a plurality of circumferentially spaced, axially extending barriers are affixed to the inner surface of the jacket between the jacket and mold, said barriers dividing said space into said plurality of cooling zones and said cooling zones spaced circumferentially around said mold.

5. A crystallizing mold as in claim 4, wherein a circumferentially extending barrier is affixed to the inner surface of the jacket in each zone between the coolant fluid inlet and outlet for the zone.

6. A crystallizing mold as in claim 5, wherein a plurality of axially upwardly extending baffles are fixed to said inner surface of the jacket in each zone and extend upwardly from the bottom end of said jacket toward said circumferentially extending barrier but spaced downwardly therefrom, and a plurality of substantially similar, downwardly extending baffles are fixed to said inner surface in alternating relationship with said upwardly extending baffles and extend from the barrier toward the bottom edge of the mold but spaced upwardly therefrom, to define said tortuous flow passage.

7. A crystallizing mold as in claim 1, wherein seal means are engaged between said retaining rings and said jacket and between said retaining rings and said mold to effect a seal therebetween.

8. A crystallizing mold for cooling and shaping weld metal, comprising a coolant jacket, a weld metal engaging mold supported within and spaced from said coolant jacket defining a space therebetween, means in said space dividing said space into a plurality of separate cooling zones, baffle means in each of the cooling zones defining a tortuous coolant fluid flow passage through each zone, said baffle means comprising a plurality of elongate, substantially parallel, spaced apart baffles in each zone extending transversely across the space between the jacket and mold, with alternate baffles extending from one end of the space toward and spaced from the other end thereof, and coolant fluid inlet and outlet means for each passage to circulate the coolant fluid through each zone to cool the mold supported within the jacket and thus cool weld metal engaged by the mold.

9. A crystallizing mold as in claim 8, wherein retaining means are secured to said jacket at opposite ends thereof and interengaged with opposite ends of said mold to retain said mold in position in said jacket.

10. A crystallizing mold as in claim 9, wherein said mold is substantially coextensive in length with said jacket.

11. A crystallizing mold as in claim 9, wherein said retaining means comprises a pair of similar annular retaining rings secured to the upper and lower edges, respectively, of the jacket, and interengaging channel and wall means on said mold and retaining rings to accurately position and maintain said mold in said jacket.

12. A crystallizing mold as in claim 9, wherein said retaining means comprises a pair of similar annular retaining rings secured to the upper and lower edges, respectively of the jacket, and interengaging channel and wall means on said mold and retaining rings to accurately position and maintain said mold in said jacket.

13. A crystallizing mold as in claim 12, wherein seal means are engaged between said retaining rings and said jacket and between said retaining rings and said mold to effect a seal therebetween.

* * * * *